(12) United States Patent
Houlberg et al.

(10) Patent No.: US 6,205,499 B1
(45) Date of Patent: Mar. 20, 2001

(54) SYSTEM FOR COMPRESSING VIDEO DATA USING BI-ORTHOGONAL WAVELET CODING HAVING A DSP FOR ADJUSTING COMPRESSION RATIOS TO MAINTAIN A CONSTANT DATA FLOW RATE OF THE COMPRESSED DATA

(75) Inventors: Christian L. Houlberg, Ventura; Philip J. McPartland, Oxnard, both of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/226,634

(22) Filed: Dec. 18, 1998

(51) Int. Cl.$^7$ ...................................................... G06F 13/10
(52) U.S. Cl. ............................. 710/68; 710/71; 382/232; 382/244
(58) Field of Search .................................. 710/65, 68–71; 711/100–105; 348/391–396, 398, 403–405; 375/141, 142; 382/166, 232, 244–253

(56) References Cited

U.S. PATENT DOCUMENTS

| | | | | |
|---|---|---|---|---|
| 5,159,336 | * | 10/1992 | Rabin et al. ............................. | 341/51 |
| 5,838,377 | * | 11/1998 | Greene ................................. | 348/398 |
| 6,115,341 | * | 9/2000 | Hirai ..................................... | 369/59 |
| 6,122,310 | * | 9/2000 | Ziemer et al. ......................... | 375/142 |
| 6,125,201 | * | 9/2000 | Zador ................................... | 382/166 |
| 6,139,197 | * | 10/2000 | Banks .............................. | 395/200.47 |
| 6,144,773 | * | 11/2000 | Kolarov et al. ....................... | 382/240 |

* cited by examiner

Primary Examiner—Thomas Lee
Assistant Examiner—Thuan Du
(74) Attorney, Agent, or Firm—David Kalmbaugh

(57) ABSTRACT

An encoder for compressing video data to allow for its transmission over a narrow bandwidth. The encoder comprises a multiformat video codec for real-time compression digital data and a dynamic random access memory which operates as a temporary storage device storing compressed data while the codec is compressing data. A digital signal processor adjust the data compression ratio for the codec while the codec is compressing video data. An EPROM, which is connected to the digital signal processor contains the software to run the digital signal processor. A programmable gate array operates as an interface between the codec and an external processor. The array includes a read write controller which provides a read signal to the codec to allow compressed video data to be read from the codec to a parallel to serial shift register within the array. The write control signals which allow data to be written into and shifted through the register are also generated by the read write controller. The array includes a FIFO flush data controller which is used to flush data from a FIFO within the codec whenever the codec supplies a service request signal to the programmable gate array. The service request signal is provided to the array whenever an overflow condition is about to occur within the FIFO of the codec.

20 Claims, 10 Drawing Sheets

SYSTEM FOR COMPRESSING VIDEO DATA USING BI-ORTHOGONAL WAVELET CODING HAVING A DSP FOR ADJUSTING COMPRESSION RATIOS TO MAINTAIN A CONSTANT DATA FLOW RATE OF THE COMPRESSED DATA

BACKGROUND OF THE INVENTION

1. Field of the Invention

This invention relates generally to video signal encoding systems. More particularly, the present invention is concerned with a digital encoding system for encoding video signals which uses bi-orthogonal wavelet coding to compress digitized video data.

2. Description of the Prior Art

There is currently a need for the reliable transmission and reception of real time television video and/or television sub video over a narrow bandwidth. For example, in the transmission of telemetry video data from a missile the telemetry channel may have a bandwidth of two megahertz or even substantially less than two megahertz.

Prior art methods and apparatus for compressing real time video data include Adaptive Differential Pulse Code modulation (ADPCM), Joint Photography Experts Group (JPEG) and Motion Picture Experts Group (MPEG). These methods of encoding real time video data are generally not capable of sufficient bandwidth reduction or are susceptible to excessive data loss in a noisy environment.

For example, Adaptive Differential Pulse Code modulation, which is used by the International Range Instrumentation Group to transmit telemetry data, is noise immune, however, it is not capable of real time video data compression to allow accurate and reliable transmission of the data over a channel narrower than five megahertz. Even moderately complex video images overload an ADPCM encoder causing it to lose fields and even multiple frames of video data.

Both Joint Photography Experts Group and Motion Picture Experts Group methods and encoders are capable of compressing real time video data sufficiently to allow the data to be transmitted over a two megahertz channel, however, these methods and encoders are susceptible to noise. A single noise hit, for example, can cause the lose of an entire video field or even multiple fields. In addition, JPEG and MPEG encoding can distort an image with the random appearance of square blocks caused in a noisy environment by a reflection of eight by eight pixel discrete cosine transform used encode the video data.

Accordingly, there is a need for an encoder to accurately and reliably encode complex video data which allow for its transmission over a bandwidth of two megahertz without distortion of the data caused by noise.

SUMMARY OF THE INVENTION

The present invention overcomes some of the disadvantages of the prior art including those mentioned above in that it comprises a highly reliable and effective encoder for compressing video data to allow for its transmission over a narrow bandwidth of two megahertz or less.

The video encoder of the present invention comprises a multiformat video codec which is a video encoder optimized for real-time compression of interlaced digital data and a dynamic random access memory coupled to the multiformat video codec. The dynamic random access memory functions as a temporary storage device storing compressed data while the codec is compressing video data.

Multiformat video codec also has connected thereto a digital signal processor which adjust the data compression ratio for codec while the codec is compressing video data. Digital signal processor monitors the quantity or amount of compressed 32 bit words provided by codec during each field of video data to adjust the data compression ratio. There is also connected to the digital signal processor an EPROM which contains the software to run digital signal processor.

A microcontroller which is connected to the multiformat video codec is used to initialize the codec upon power up providing the contents of the bin width registers, reset commands and the initial compression ratio to the multiformat video codec.

Coupled to the multiformat video codec is a programmable gate array which operates as an interface between the codec and an external host processor. The programmable gate array converts parallel data from the codec to serial data for transmission to the external host processor and also provides a constant serial data rate to the external host processor.

The programmable gate array includes a read write controller which provides a read signal to the codec to allow compressed video data to be read from the codec and then supplied to an eight bit parallel to serial shift register within the gate array. The write control signals which allow data to be written into and shifted through the parallel to serial shift register are also generated by the programmable gate array. The programmable gate array includes a FIFO flush data controller which is used to flush data from a FIFO within the codec whenever the codec supplies a service request signal to the programmable gate array. The service request signal is provided to the array whenever an overflow condition is about to occur within the FIFO of the codec. Compressed video data is then flushed out of the FIFO within the codec.

The codec also provides a FIFO stop signal to the gate array which indicates that the FIFO within the codec is empty. The programmable gate array then sets a FIFO_MASK flag to a logic one state t0 prevent a read operation of the FIFO within the codec. A dummy Mallet block is generated by the gate array and transmitted to the external host processor.

DETAILED DESCRIPTION OF THE PREFERRED EMBODIMENT

Figure 1A:
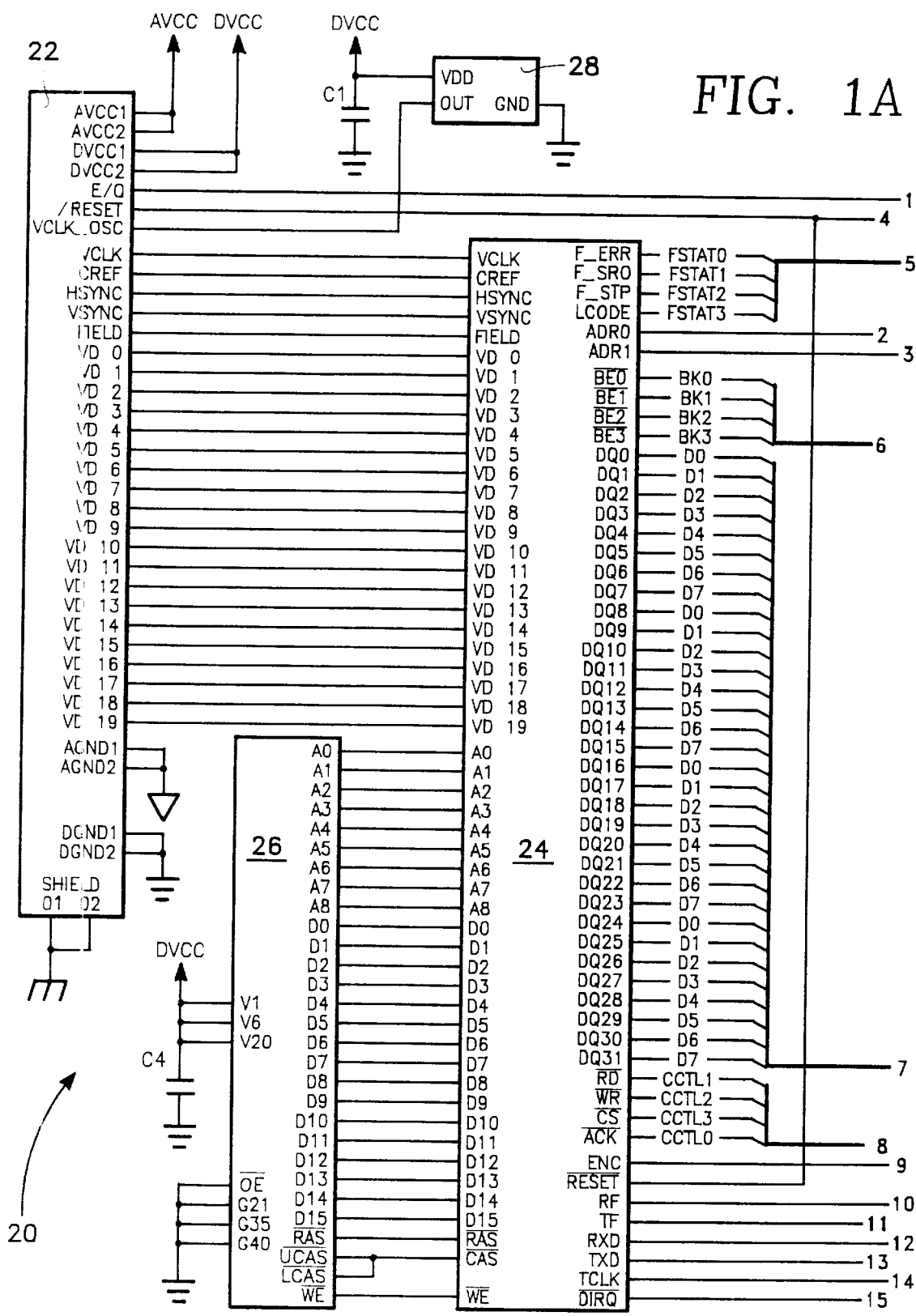
FIGS. 1A–1F is a detailed electrical schematic diagram of the video encoder which constitutes a preferred embodiment of the present invention.

Referring now to FIGS. 1A–1F, there is depicted in FIGS. 1A–1F a video encoder 20 which compresses video data for transmission over a bandwidth of two megahertz or less. Video data is supplied from a digital multistandard colour decoder (not illustrated) to encoder 20 via an input terminal 22. The data supplied to encoder 20 from the digital multistandard colour decoder has 16 digital bits with eight bits comprising the digital luminance signal (Y) and eight bits comprising the colour difference or chrominance signal (UV). This data is provided as 16-bit YUV-bus transfer digital data from the colour decoder. The colour decoder may, in turn, receive an analog video signal from a video camera, a video tracking device on board a missile or any other device which provides analog video signals at its video output.

Coupled to terminal 22 is a multiformat video codec 24 which is a video encoder/decoder optimized for real-time compression and decompression of interlaced digital data. Coupled to multiformat video codec 24 is a dynamic random access memory (DRAM) 26 which functions as a temporary storage device storing compression data while codec 24 is compressing data.

The multiformat video codec 24 includes an internal compression processor with the compression processor's compression algorithm being based on the bi-orthogonal (7,9) wavelet transform of Ingrad Daubechies. The compression processor's compression algorithm implements field independent sub-band coding. Sub-band coders transform two-dimensional spatial video data into spatial frequency filtered sub-bands. The quantization and entropy encoding processes provide the codec's data compression.

There is also connected to multiformat video codec 24 a digital signal processor (DSP) 42 which adjust the compression ratio for codec 24 while multiformat video codec 24 is compressing video data. For complex video images the compression ratio generally requires constant adjustment. Digital signal processor 42 monitors the quantity or amount of compressed 32 bit words provided by codec 24 during each field of video data.

The software for processor 42 is designed to maintain the number of words per field being provided by codec 24 at a preset or a predetermined number of words per field. Whenever there is an increase in the number of words per field being provided by codec 24, digital signal processor 42 increases the compression ratio for the bin width registers of codec 24 reducing the quantity of data flowing from codec 24. This maintains the number of words per field flowing from codec 24 at the predetermined or preset number. Whenever the data flow rate from codec 24 needs to be increased to maintain the required number of words per field, digital signal processor 42 reduces the compression ratio for the bin width registers of codec 24 to increase the number words per field or bit rate being provided by codec 24.

Multiformat video codec 24 includes bin width registers which are initialized to their compression ratios and to provide the amount of compressed data being provided by codec 24 per field. A compression ratio of about 80 to 1 may be used by codec 24 and still allow the user maintain a quality image.

Digital signal processor 42 includes a serial port which updates the bin width registers within codec 24. The serial port includes a terminal /IRQ2 which when active indicates that a word is being read out of codec 24 allowing processor 42 to count the number of words per field of compressed data from codec 24. Typically, codec 24 provides between 200 and 400 thirty bit words per field. The terminals TFS1, RFS1, DT1, DR1 and SCKL1 are used to supply compression ratio data for the bin width register compression ratios.

Connected to digital signal processor 42 is an EPROM 44 which has the software to run digital signal processor 42. EPROM 44 is programmed via EPROM connector 46 which may be coupled to an external programming source (not illustrated). EPROM connector 46 has a bus request line (/BR) which is connected to the /BR input of processor 42 and a bus grant line (/BG) which is connected to the /BG output of processor 42. When the /BR line is active, digital signal processor 42 tri-states its inputs and outputs to allow the digital signal processor 42 to be re-programmed. When the /BG line becomes active, the user of video encoder 20 may begin reprogramming digital signal processor 42.

Multiformat video codec 24 is a Model ADV601 multiformat video codec commercially available from Analog Devices of Norwood, Mass. Codec 24 comprises nine basic functional blocks with four of these blocks being interface blocks and five of the blocks being internal processing blocks. The interface blocks include a Digital Video I/O Port, a Host I/O Port, an external DRAM manager, and a DSP serial I/O Port. The functional blocks include a Wavelet Kernel, an On-Chip Transform Buffer, an Adaptive Quantizer, a Run Length Coder, and a Huffman Coder.

The Digital Video I/O Port provides a real-time uncompressed video interface to support a broad range of component digital video formats, including "D1". The Host I/O Port carry control, status, and compressed video to and from the host processor. A 512 position by 32-bit FIFO buffers the compressed video stream between the host processor and the Huffman Coder.

The DRAM Manager performs all tasks related to writing, reading, and refreshing the external DRAM. The external host buffer DRAM is used for reordering and buffering quantizer input and output values.

The Serial Port supports, during encode only, communication of wavelet statistics between the Wavelet Kernel and the Digital Signal Processor and quantizer control information between the Digital Signal Processor and the Quantizer. The user programmed compression ratio is also sent from the codec host interface to the Digital Signal Processor automatically.

The Wavelet Kernel gathers statistics on a per field basis and includes a block of filters, the interpolators, and decimators. The Wavelet Kernel calculates forward and backward bi-orthogonal, two-dimensional, separable wavelet transforms on horizontal scanned video data. The Wavelet Kernel uses the Transform Buffer when performing wavelet transforms calculated on an entire image's data to eliminate a need for extremely fast external memories. The resultant filtered image is made up of components of the original image and is identified as a modified Mallat Tree which includes Mallat the blocks of video data.

The On-chip Transform Buffer provides an internal set of SRAM for use by the wavelet transform kernel. The On-chip Transform Buffer provides enough delay line storage to support calculation of separable two dimensional wavelet transforms for horizontally scanned images.

The Adaptive Quantizer quantizes wavelet coefficients. This block compresses the filtered image based on the response profile of the human visual system. Quantize controls are calculated by the external Digital Signal Processor during encode operations. Each quantizer Bin Width (BW) is computed by Bin Width calculator software to maintain a constant compressed bit rate. A Bin Width is a per block parameter the quantizer uses when determining the number of bits to allocate to each block or sub-band.

The Run Length Coder performs zero and non-zero run length encoding for more efficient Huffman coding. The run-length coder looks for long strings of zeros and replaces it with short hand symbols. This data coding is optimized across the subbands and varies depending on the block being coded.

The Huffman coder is a digital compressor/decompressor that can be used for compressing digital data. The Huffman Coder performs Huffman coder and decoder functions on quantized run length coder coefficient values. The Huffman coder uses three ROM-coded Huffman tables that provide excellent performance for wavelet transformed video.

Essentially, a Huffman coder creates a table of the most commonly occurring code sequences and then replaces these codes with a short hand code.

Coupled to multiformat video codec 24 is a programmable gate array 30 which operates as an interface between codec 24 and an external host processor which may be a telemetry system. Programmable gate array 30 converts parallel data from codec 24 to serial data for transmission to the host external processor and also provides a constant serial data rate to the external host processor.

The programmable gate array 30 used in the preferred embodiment is a Model EPM7192 Field Programmable Gate Array commercially available from the Altera Corporation of San Jose, Calif.

Programmable gate array 30 is coupled to a serial interface connector 40 which, in turn, connects the programmable gate array 30 to the external host processor. Video encoder 20 also has a parallel interface connector 32.

Serial interface connector 40 receives from the external host processor three control signals VSEL (video select), CNT6 (count six) and CNT15 (count fifteen). These signals allow programmable gate array 30 to transfer data to the external host processor whenever VSEL is high and CNT6 or CNT15 are pulsed high.

Programmable gate array 30 supplies a VDATEN (video data enable) signal to the external host processor which indicates to the processor that data is being provided by array 30 to the processor. Programmable gate array 30 also supplies a /EMPTY signal to the external host processor which indicates to the processor that the FIFO within codec 24 is empty. The clock signal SCLK is supplied to programmable gate array 30 by the external host processor to clock data to the processor from array 30. Data is supplied from programmable gate array 30 to the external host processor via the SIO (serial data out) line.

When jumper 36 is enabled oscillator 38 is connected to programmable gate array 30 supplying its clock signal to array 30. Oscillator 30 generally provides a 10–20 megahertz clock signal to programmable gate array 30.

A microcontroller 56 is connected to the multiformat video codec 24. Microcontroller 56 is used to initialize codec 24 upon power up. For example, microcontroller 56 provides the contents of the bin width registers, reset commands and the initial compression ratio to the multiformat video codec 24. The software for microcontroller 56 is set forth in Appendix A.

The microcontroller 56 used in the preferred embodiment of the present invention is a Model 87C251 microcontroller chip commercially available from Intel corporation of Santa Clara, Calif.

Port P0 of microcontroller 56 is used to display error conditions which occur upon initialization and also to set the initialization mode which is the video encode/decode mode for video encoder 20. When MODE 0 and MODE 1 (P0.0 and P0.1 of microcontroller 56) are high the codec is initialized as an encoder or decoder. These logic ones are supplied to microcontroller 56 by a pull-up resistor array 56 which has nine resistors pulled up to 5 VDC. The mode of operation is selected by using jumpers 52 and 54. When neither jumper 52 and 54 is enabled, the mode of operation is the default mode which results in codec 24 operating as an encoder or decoder. An ENCODE/DECODE signal from the digital multistandard colour decoder is supplied to the P0.7 input of microcontroller 56. When the ENCODE/DECODE signal is high, codec 24 operates as an encoder. When the ENCODE/DECODE signal is low, codec 24 operates as an decoder.

Microcontroller 56 supplies data to codec 24 via its port P1. The bank select signals, control signals and address signals are provided to codec 24 via port P2 of microcontroller 56. Codec 24 sets its ENC output high whenever codec 24 is operating as an encoder. Microcontroller 56 also has two address lines ADR0 and ADR1 which address one of four registers within codec 24. Address two addresses the 32 bit FIFO of codec 24 with ADR0 being a logic zero and ADR1 being a logic one. When ADR0 and ADR1 are high the control or status register is being addressed. When ADR0 and ADR1 are both low, the indirect data register of codec 24 is being addressed. When ADR1 is low and ADR0 is high, the indirect address register of codec 24 is being addressed.

An acknowledge signal (CCTL0) from codec 24 is provided to microcontroller 56 via P3.3 of microcontroller 56. The microcontroller 56 supplies control signals CCTL1, CCTL2 and CCTL3 to codec 24. These signals are respectively a read signal, a write signal and a chip select signal with each signal being active low and the write signal being a pulse signal. The chip select signal as well as addressing and a bank select signal must be on prior to using the write signal to write data from microcontroller 56 into codec 24.

Programmable gate array 30 reads data from the multiformat video codec 24 in eight bit bytes. The data is supplied from array 30 in 32 bits words. This, in turn, necessitates that programmable gate array 30 read the data in four eight bit bytes. Programmable gate array 30 supplies four byte enable signals /BE0, /BE1, /BE2 and /BE3 to codec 24 to allow codec 24 to sequentially provide four eight bit bytes of data to array 30. The order in which the data is read from a FIFO (first in first out) within codec 24 is byte 0, byte 1, byte 2 and byte 3 which then allows the FIFO within codec 24 to increment to the next 32 bit word. It should be noted that data from the FIFO within codec 24 is supplied to the FIFO within codec 24 by dynamic random access memory 26.

Coupled to programmable gate array 30 is a connector 34 which allows the user of video encoder 20 to program gate array 30 using an external programming device. Connector 34 also allows the user of video encoder 20 to test gate array 30.

Referring now to FIGS. 1A–1F and 2, programmable gate array 30 (FIG. 2) includes a read write controller 64 which provides a read signal to codec 24 to allow compressed video data to be read from codec 24 and then supplied to an eight bit parallel to serial shift register 62. The write control signals which allow data to be written into and shifted through register 62 are also generated by programmable gate array 30. Programmable gate array 30 also includes a FIFO flush data controller 60 which is used to flush data from the FIFO of codec 24 whenever codec 24 supplies a service request signal (F_SRQ) to programmable gate array 30. The service request signal is provided to array 30 by codec 24 whenever an overflow condition is about to occur within the FIFO of codec 24. One Mallat block of compressed video data is then flushed out of the FIFO of codec 24.

Codec 24 provides a FIFO error signal to F_ERR input of array 30 and P3.4 of microcontroller 56 which indicates that an overflow of data has occurred. This results in a requirement to re-initialize multiformat video codec 24. Codec 24 also provides a FIFO stop signal to the F_STP input of array 30 and P3.6 of microcontroller 56 which indicates that the FIFO of codec 24 is empty. In addition, codec 24 provides a FIFO status 3 signal to the LCODE input of codec 24 and P3.6 of microcontroller 56 which indicates that the last word of a field is being written out of multiformat video codec 24.

An active low pulsed reset signal is provided from P3.0 of microcontroller 56 to the /RESET input of codec 24 and the /RESET input of array 30. This pulsed reset signal resets the registers within array 30 and functions as the hardware reset for codec 24.

Microcontroller 56 also provides via P3.1 an INIT signal to the INIT input of array 30. When the INIT signal is low, the INIT signal indicates to array 30 that array 30 is now controlling the operation of video encoder 20. When microcontroller 56 sets the INIT signal high, microcontroller 56 initializes codec 24 and also indicates to array 30 that codec 24 is being initialized which results in array 30 being taken off line.

Figure 1B:
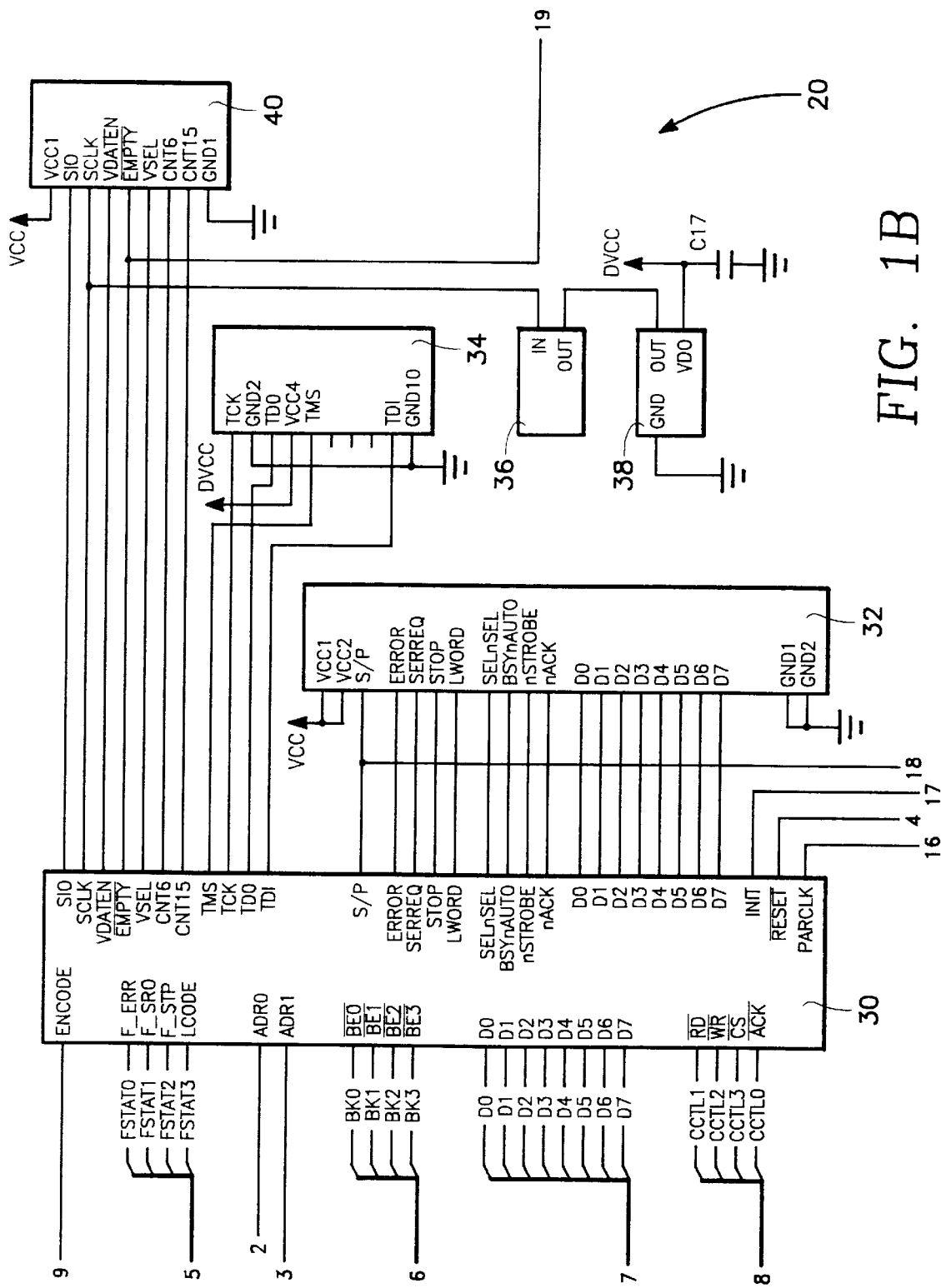
Figure 1C:
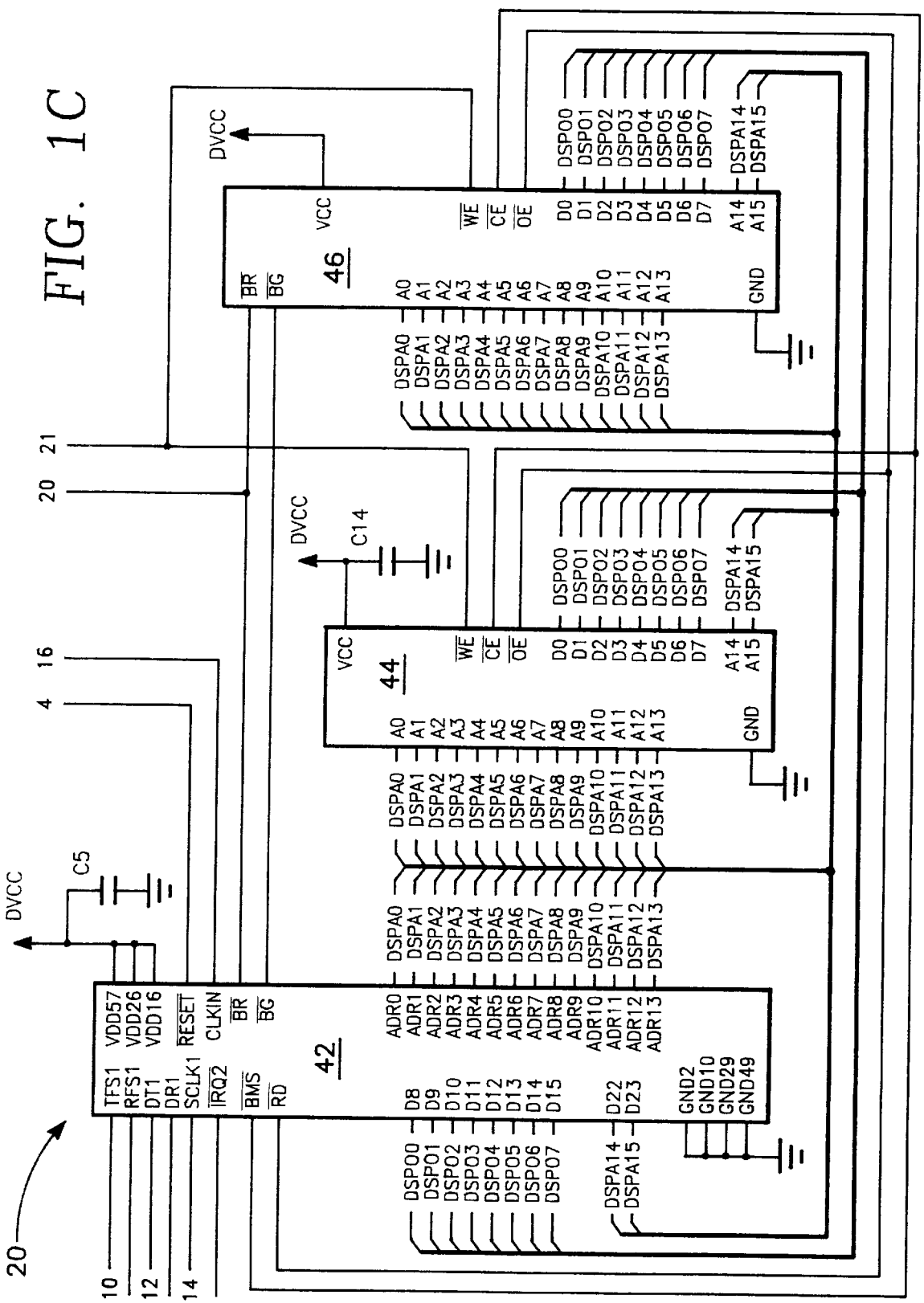
Figure 1D:
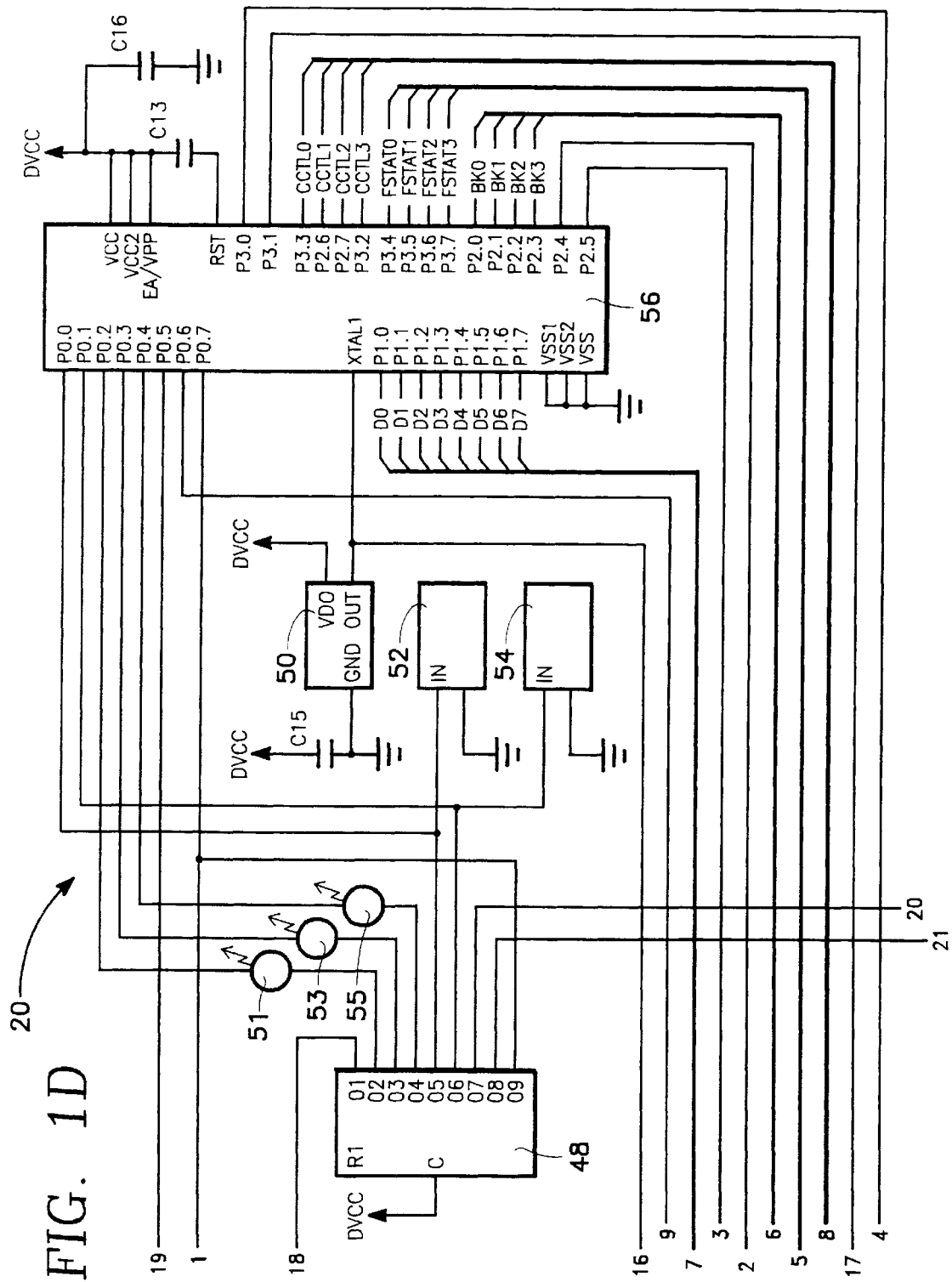
Figure 1E:
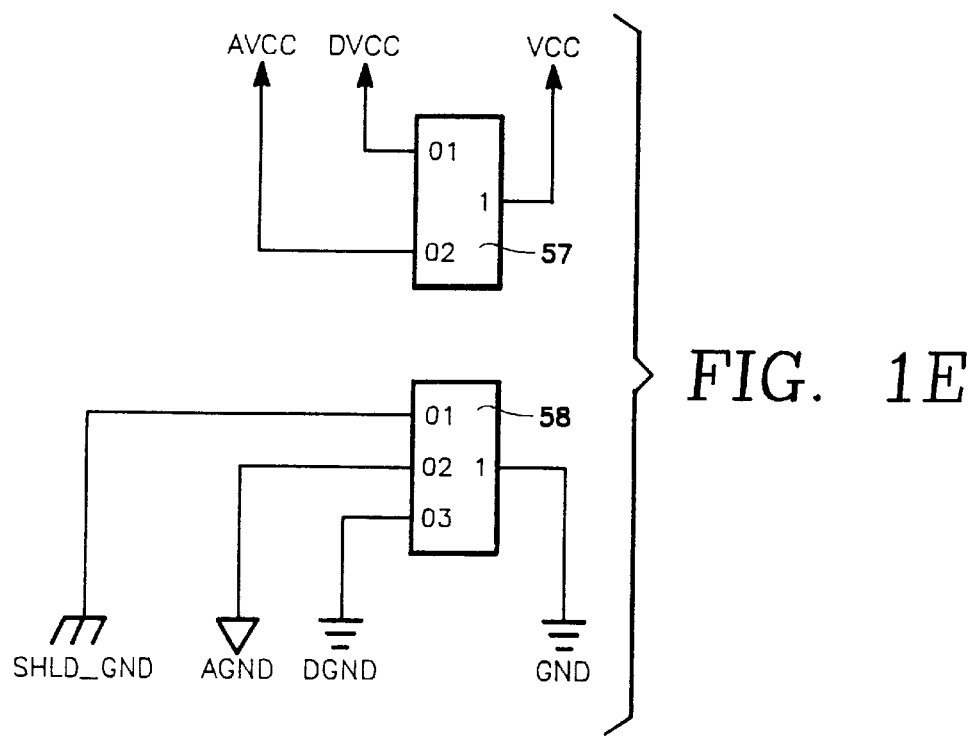
Figure 1F:
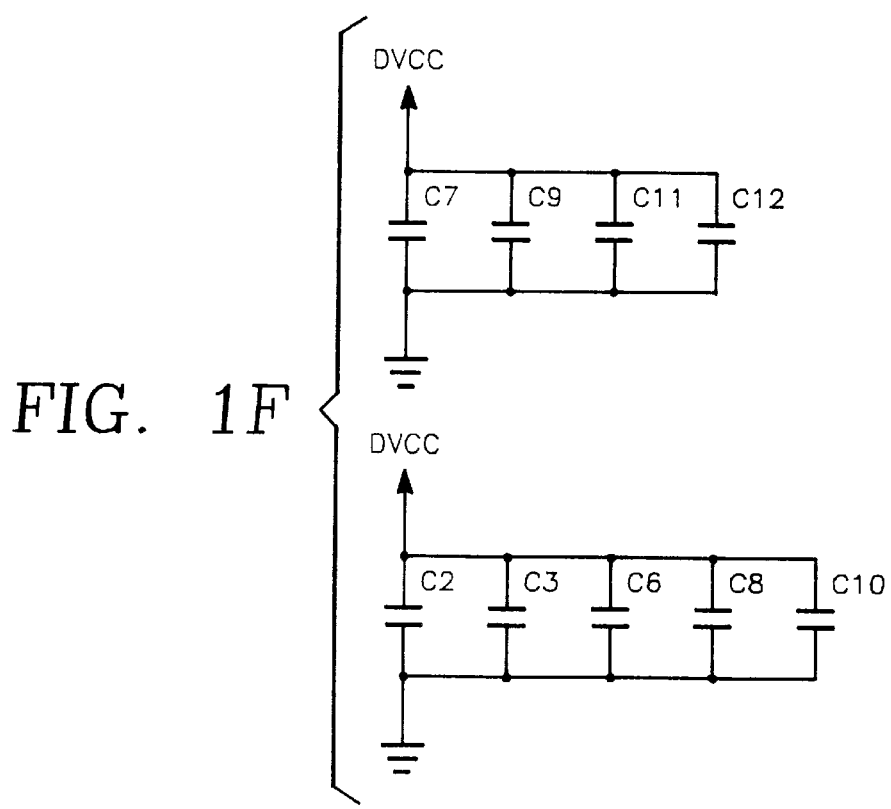

Referring to FIGS. 1E and 1F, pad 57 splits incoming voltage VCC into a digital voltage DVCC and an analog voltage AVCC. Similarly, an incoming ground GND is split into a digital ground DGND and an analog ground AGND as well as a shielded ground SHLD_GND which blocks noise.

Capacitors C2, C3, C6, C7, C8, C9, C10, C11 and C12 are used to filter digital power thereby providing a clean power source for the digital integrated circuits of video encoder 20.

Referring to FIGS. 1A, 1B, 2 and 5, programmable gate array has a pair of tri-state buffers 66 and 68 which are tri-stated when their enable input is at the logic one state. When the enable input to tri-state buffers 66 and 68 is low buffers 66 and 68 are enabled.

Microcontroller 56 supplies an initialize signal to array 30 via its INIT input which is then provided to buffers 66 and 68. The initialize signal allows microcontroller 56 to communicate with codec 24 while the control signals between codec 24 and array 30 are disabled.

Figure 2:
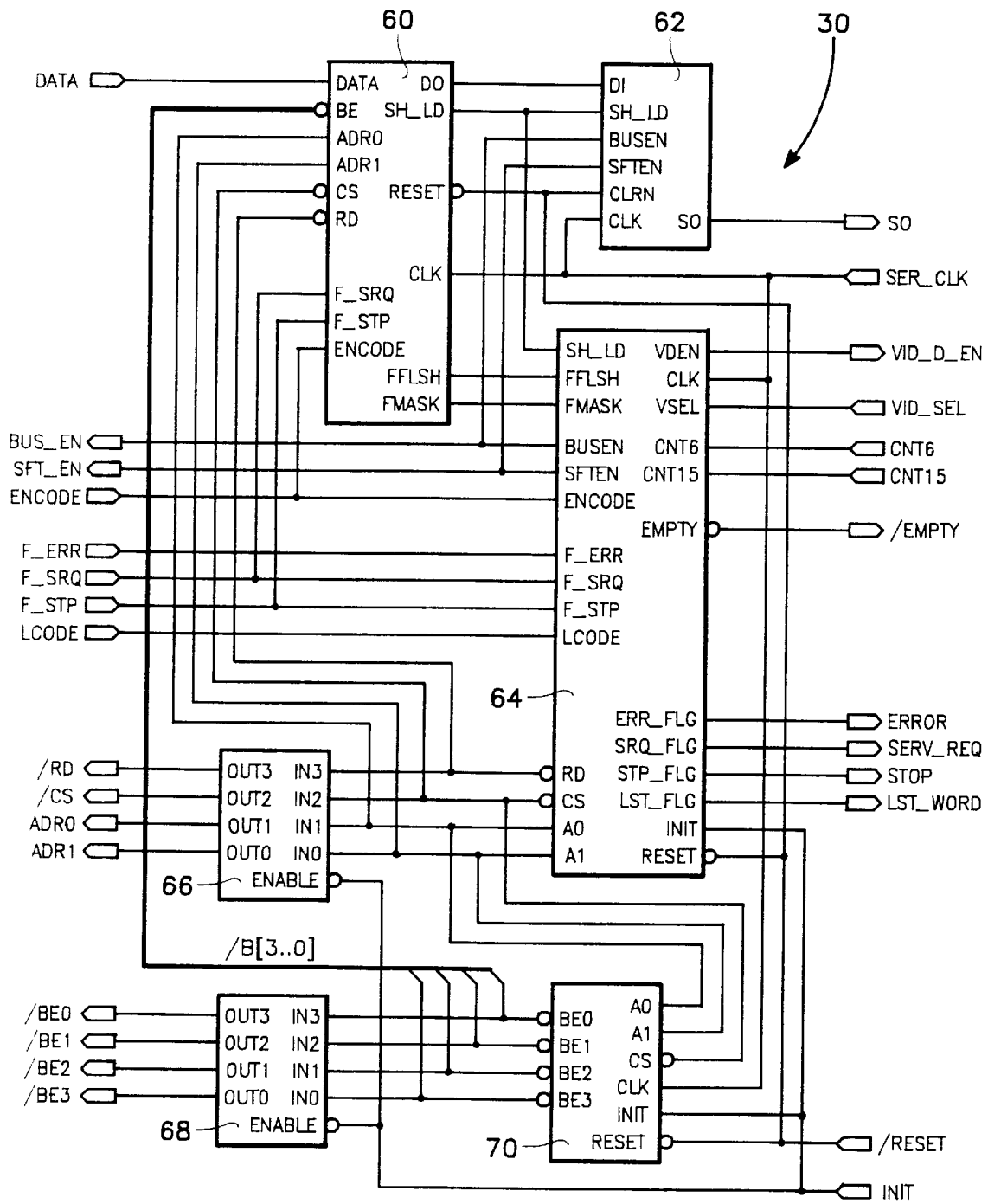
FIG. 2 is an electrical block diagram of the programmable gate array of FIG. 1B.
Figure 3:
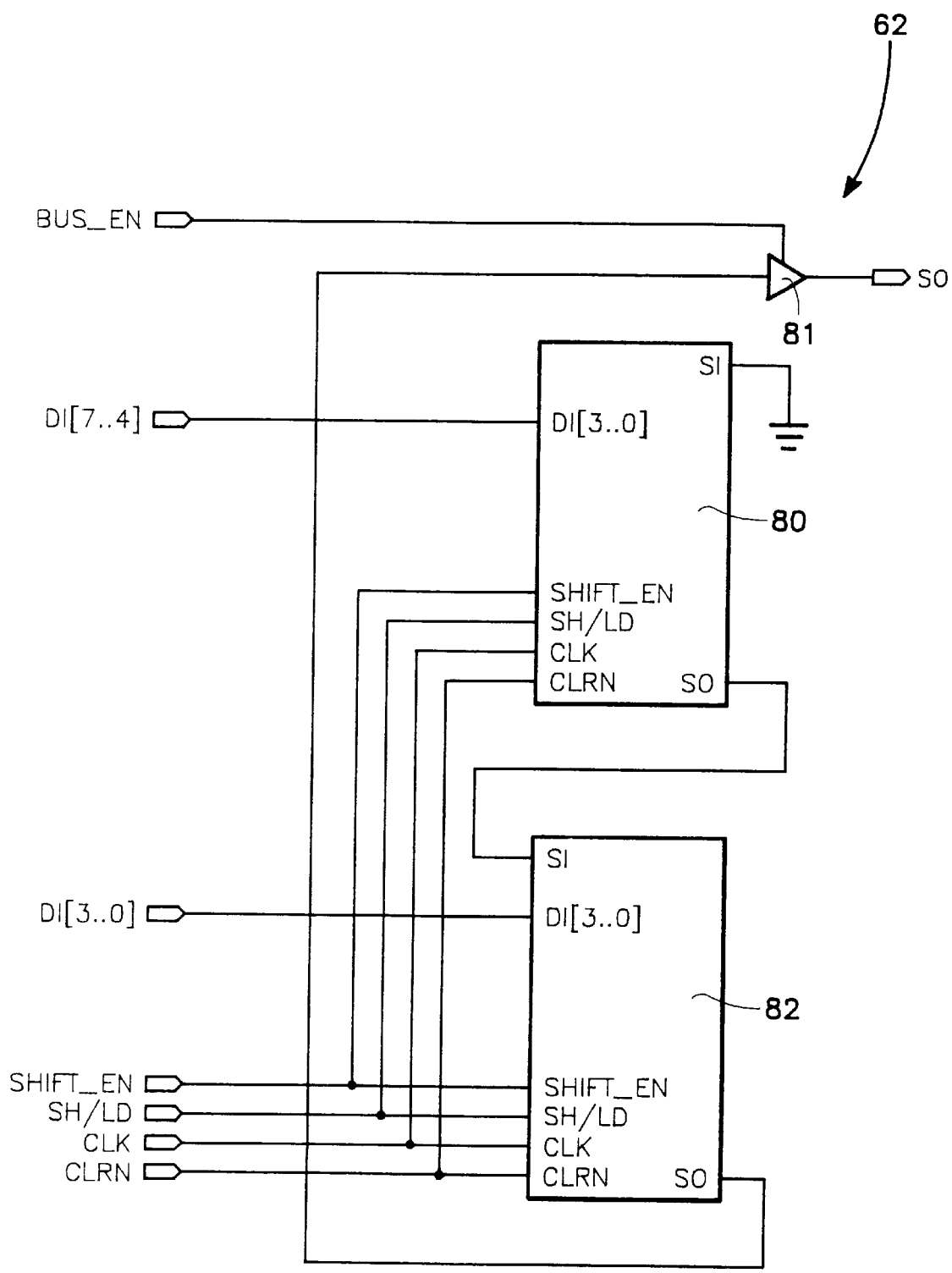
FIG. 3 is a electrical block diagram of the eight bit parallel to serial shift register of FIG. 2.
Figure 4A:
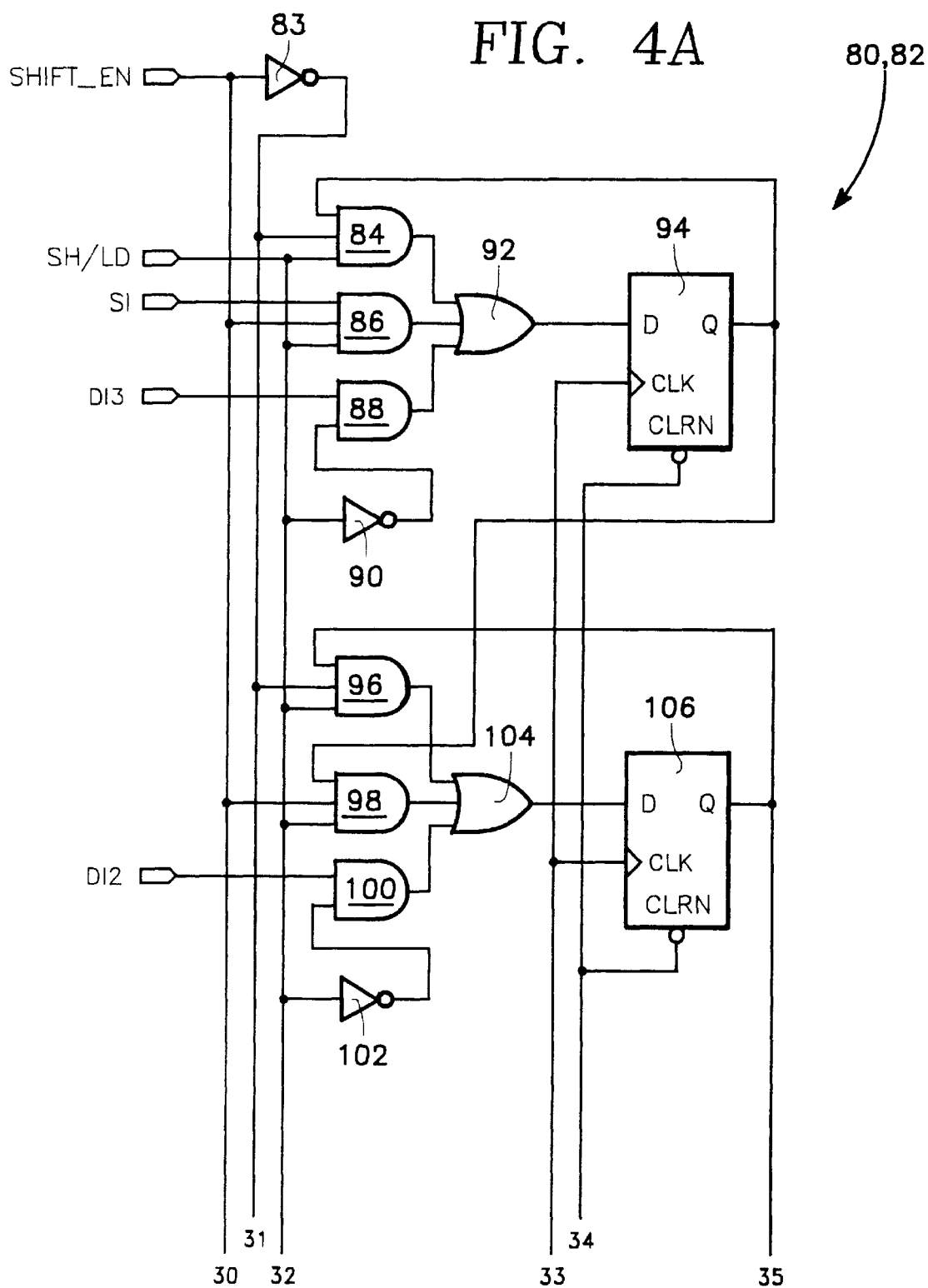
FIGS. 4A–4B is a detailed electrical schematic diagram the four bit parallel to serial shift register of FIG. 3.
Figure 4B:
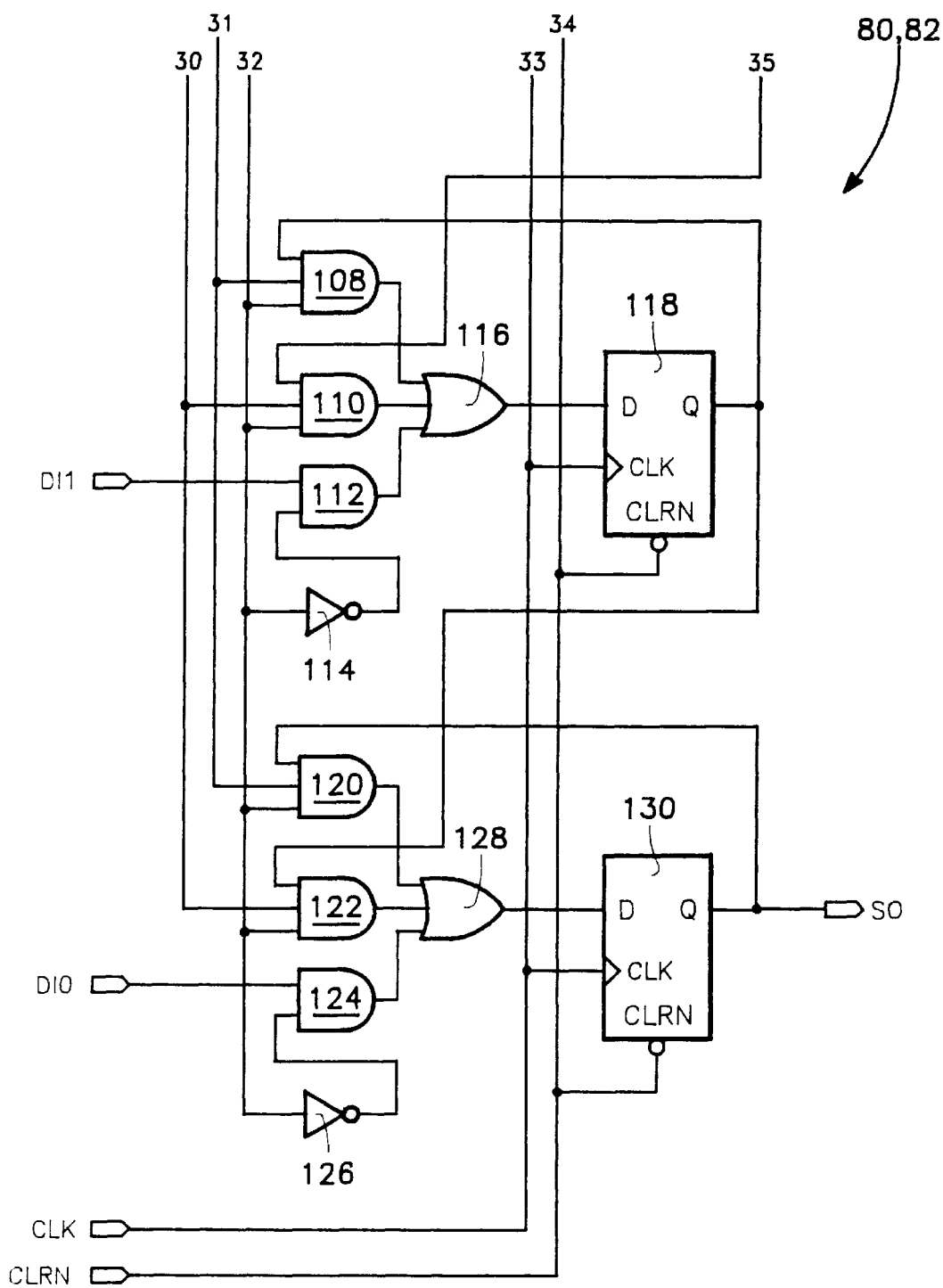
Figure 5:
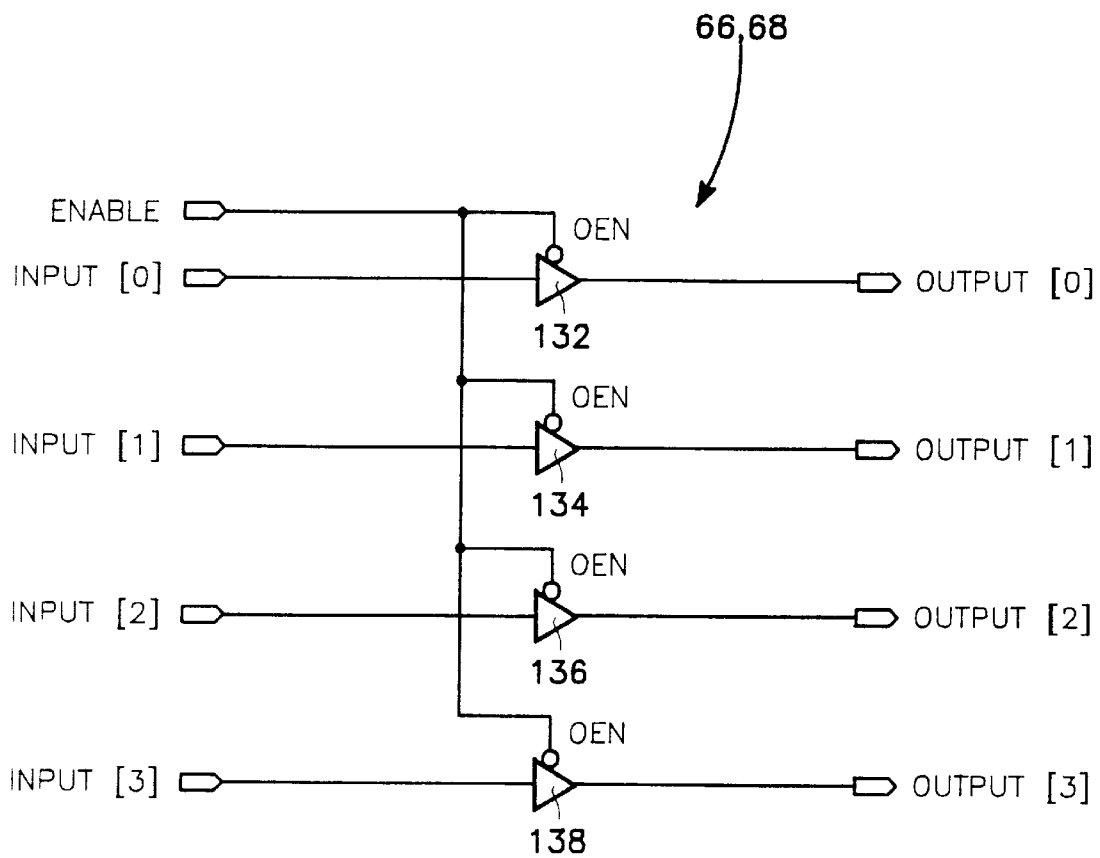
FIG. 5 is a detailed electrical schematic diagram of the quad tri-state buffer of FIG. 2.

Referring to FIGS. 1A, 1B and 2, programmable gate array 30 includes a read write controller 64 which controls the transfer of compressed video data from codec 24 to the external host processor. Read write controller 64 has a pair of state machines with the software for each state machine being set forth in the read write controller file listing of Appendix B. The first of the pair of state machines of controller 64 has states s0–s10 and is used to generate the read signal, a chip select signal, a bus enable signal and the video data enable signal. The state machine's outputs are ur (unqualified read), uc (unqualified chip select), bus_en (bus enable) and vdata_en (video enable).

The chip select signal is an active low signal which selects codec 24, while the read signal is an active low signal which is provided to codec 24 to allow to be read from codec 24. The read signal and the chip signal read each byte of each 32 bit word of compressed data from codec 24.

The input signals to the first of the pair of state machines of controller 64 are the control signals VSEL (video select), CNT6 (count six) and CNT15 (count fifteen). The start input signal is equated to the CNT6 or CNT15 signals. The first state machine of read write controller 64 generates the active low chip select and read signals to read one eight bit byte from codec 24. States s3 through s7 are counting states which occur when bits 7–3 of the eight bit byte are shifted through parallel to serial shift register 62.

When the first state machine of read write controller 64 is at state s8 and the vsel input thereto is low (indicating that this is the last byte of data being requested by the external host computer) the state machine proceeds through states s8, s9 and s10 before returning to state s0. When the first state machine of read write controller 64 is at state s8 and the vsel input thereto is high (indicating that the external host computer is requesting additional data), the state machine proceeds through states s11, s12 and s13 returning to state s4. The first state machine of read write controller 64 then continues through states s4, s5, s6, s7, s8, s11, s12 and s13 until the last byte of data from codec 24 is transferred to the external host computer.

At this time it should be noted that whenever, for example, the vsel input is low state s0 is inactive or ideal. Whenever the vsel input is high state s0 is active and the state machine will begin to cycle through its various states. It should also be noted that the state machine's cycling through states s1, s2 and s3 creates an active low read pulse which transfers an eight bit byte of data from codec 24 to parallel to serial shift register 62 which converts the data from a parallel format to a serial format. In addition, it should be noted that whenever the state machine is in state s9 and vsel returns to the logic one state the state machine will proceed to state 12. When the state machine is in state s9 and vsel remains at a logic zero the state machine will cycle to state s10.

The second of the pair of state machines of read write controller 64 is responsible for handling of the data from codec 24 whenever an overflow or underflow condition occurs. The inputs to the second state machine of read write controller 64 include uc (unqualified chip select) and ur (unqualified read) as well as fifo_flush and fifo_mask. The outputs of the second state machine of read write controller 64 are cs (chip select) and rd (read).

The unqualified chip select and unqualified read signals are provided by the first state machine of controller 64, while the fifo_flush and fifo_mask signals are provided by controller 60 to the second state machine of controller 64.

When the fifo_flush input is at the logic one state, the FIFO within codec 24 is at an overflow condition. The fifo_mask input is set to the logic one state t0 prevent reads of the FIFO within codec 24.

The function of the second state machine of controller 64 is to generate the chip select signal and read signal which are supplied to codec 24. When the fifo_flush input and the fifo_mask input are inactive, the unqualified chip select (uc) and unqualified read (rd) signals from the first state machine of controller 64 are provided to the CS and RD outputs of read write controller 64.

When the fifo_mask is active and the second state machine of controller 64 is in state t0, the second state machine proceeds to state t6 setting the RD and CS outputs of controller 64 to the inactive logic one state. This, in turn, prevents a read operation of the FIFO within codec 24.

When the fifo_flush is active and the second state machine of controller 64 is in state t0, the second state machine proceeds to state t3. The second state machine then cycles through states t4, t5 and t6 generating a read pulse and an active low chip select signal during each cycle. This results in data being read from the FIFO within codec 24 until the fifo_flush proceeds to the inactive logic zero state.

At this time it should be noted that each video field has 42 Mallat blocks with each Mallat block comprising a band of frequencies. Each flush operation generally flushes out only one or two Mallat block which does not significantly degrade an image.

Referring to FIGS. 2, 3, 4A and 4B, read write controller 64 also provides a SH_LD (shift load) signal which is a signal generated from the ur (unqualified read) signal provided by the first state machine of controller 64. The shift load signal is supplied by controller 64 to SH_LD input of parallel to serial shift register 62. Shift register 62 comprises two four bit parallel to serial shift registers 80 and 82. Each shift register 80 and 82 has four D-type Flip-Flops 94, 106, 118 and 130 and an associated gate circuit. For example, the gate circuit for Flip-Flop 94 includes three AND gates 84, 86 and 88, an OR gate 92 and an inverter 90.

When the shift load signal is high the data which is in one Flip-Flop 94, 106, 118 or 130 of each four bit parallel to serial shift register 80 and 82 is shifted to the next sequential Flip-Flop of each four bit parallel to serial shift register 80 and 82. When the shift load signal is low the eight bits of a data byte are loaded into the four Flip-Flops 94, 106, 118 and 130 of each four bit parallel to serial shift register 80 and 82.

Referring again to FIGS. 1A, 1B and 2 during initialization of video encoder 20, the address outputs ADR0 and ADR1 of controller 64 are set to zero. When the initialization of video encoder 20 is complete the address outputs ADR0 and ADR1 of controller 64 are set to hexadecimal two which is the address of the FIFO of codec 24. The address outputs ADR0 and ADR1 of controller 64 are respectively zero and one.

Read write controller 64 also has a byte select controller 70. Byte select controller 70 sequences the four byte enable signals /BE0, /BE1, /BE2 and /BE3 for each thirty two bit word from codec 24. The software for byte select controller 70 is set forth in Appendix B. Controller 70 is a state machine having states s0–s7. When the INIT input is high the state machine of controller 70 remains at state so and each byte enable output BE0, BE1, BE2 and BE3 of controller 70 is also high. When the A0 and A1 inputs of controller 70 are both ones (hexadecimal three) the state machine of controller 70 is set to state so and the byte enable signals /BE0, /BE1, /BE2 and /BE3 provided by controller 70 are set at hexadecimal "E".

When the CS input of controller 70 transitions to a logic zero the state machine of controller 70 proceeds to state s1. While the state machine is in state si, the byte enable outputs BE0, BE1, BE2 and BE3 of controller 70 are respectively 0,1,1,1.

When the CS input of controller 70 transitions to a logic one the state machine of controller 70 proceeds to state s2. When the CS input of controller 70 again transitions to a logic zero the state machine of controller 70 proceeds to state s3. While the state machine is in state s1, the byte enable outputs BE0, BE1, BE2 and BE3 of controller 70 are respectively 1,0,1,1 which is hexadecimal "D".

Array 30 includes flush data controller 60 which is coupled to read write controller 64. The software for flush data controller 60 is set forth in Appendix B. Flush data controller 60 provides encoded data regulation for interfacing to a fixed bandwidth channel. This data regulation is accomplished by flushing Mallat Blocks of data from codec 24 when the internal FIFO of codec 24 is in danger of an over condition and by providing dummy Mallat Blocks of data when the FIFO of codec 24 is in danger of an underflow condition.

Codec 24 has a data regulation feature which is based upon detecting an increase or decrease of data comprising a video field after encoding of the data. A change in complexity in the video image will cause a corresponding change in the amount of data. Once the change is detected the encoding can be changed to allow for the difference in data thereby returning the data rate back to a desired rate. The result is a momentary increase or decrease in the amount of data that needs to be sent which may lead to an overflow or underflow condition in the FIFO of codec 24.

The FIFO_FLUSH and FIFO_MASK flags are used to regulate the transmission of the encoded data from codec 24 when either an overflow or an underflow condition within the FIFO of codec 24 is about to occur. When an overflow is about to occur (as indicated by an active high at the F_SRQ input of array 30), the FIFO_FLUSH flag is set by controller 60 to inform the circuitry of array 30 that the newly detected Mallat Block of data will probably cause an overrun of data from the FIFO within codec 24. This generates fast reads of the FIFO within codec 24 (while the FIFO_STP flag is inactive) until a subsequent or new Mallat Block is detected. When necessary, a dummy Mallat Block is sent to the external host processor until the next Mallat Block is detected. When the next Mallat Block is detected the FIFO_FLUSH flag is cleared.

If a dummy Mallat Block is sent to the external host processor, the FIFO_MASK flag is set to prevent reads of the FIFO while a Mallat Block header is synthesized. Once the header is sent to the external host processor the FIFO_MASK flag is cleared. The dummy Mallat Block header consist of FF, FF, FF, FF which is a thirty two bit word of ones followed by an eight bit byte of 8F.

When an underflow of the FIFO within codec 24 is about to occur, the current Mallat Block is truncated and a dummy Mallat Block is sent to the external host processor. While the dummy Mallat Block header and first data word are being sent to the external host processor, the FIFO_MASK flag is set by controller 60 to prevent reads of the FIFO within codec 24. Setting the FIFO_MASK flag causes read write controller 64 to cease generating the read and chip select signals to prevent a read of the FIFO within codec 24.

FIFO flush data controller 60 includes a pair of state machines which are operational when the FIFO within codec 24 is being addressed and video encoder 20 is operating in the encode mode. The ENCODE input to controller 60 must be high to be in the encode mode. When the ENCODE input is low or the FIFO within codec 24 is not being addressed the FIFO_FLUSH and FIFO_MASK flags are grounded.

The first state machine of controller 60 searches for the beginning of a Mallat block. The first state machine of controller 60 looks for FF hexadecimal during states s0, s1, s2 an s3. The detection of the header must occur sequentially from byte 0, byte 1, byte 2 and byte 3 with each byte being all ones. When the state machine of controller 60 detects 32 consecutive ones the state machine proceeds to state s4 which indicates to the second state machine of controller 60 that a header for a new Mallet block has been detected by the first state machine.

The second state machine of controller 60 determines the requirements for the operation of codec 24. During state t0 when the F_SRQ input of controller 60 is set indicating an overflow condition and the first state machine of controller 60 is at state s4, the state machine proceeds to state t1 setting the FIFO_FLUSH flag to a logic one state. This initiates a flush operation of data from the FIFO within codec 24. When the F_SRQ input of controller 60 returns to the logic zero state and a new Mallet block is detected, the Mallet block is sent to the external host processor and the state machine returns to state t0. A flush of the data from the FIFO within codec 24 is processed during states t1 through t6.

During state t7 the FIFO_MASK flag is set to a logic one state when the F_STP input to controller 60 is a one. A dummy Mallet block header is created during states t7 through t10. During states t11 and t12 the dummy Mallet block is provided to the external host processor. The second state machine will remain in state t11 as long as the F_STP input to controller 60 is a one. When F_STP input to controller 60 returns to a logic zero (indicating there is data in the FIFO within codec 24) the data from codec 24 is converted to a serial format before being supplied to the external host processor.

Following the transmission of the dummy Mallat Block header and first data word during an underflow condition, the FIFO_FLUSH flag is set and the FIFO_MASK flag is cleared. The FIFO_FLUSH flag initiates a flushing of the incoming data from the FIFO within codec 24 until a new Mallat Block is detected. When the new Mallat Block is detected the FIFO_FLUSH flag is cleared and the FIFO_MASK flag is set.

The FIFO_MASK flag is set to prevent reads of the FIFO while a new Mallat Block header is synthesized. Once the header is sent to the external host processor the FIFO_MASK flag is cleared.

From the foregoing, it may readily be seen that the present invention comprises a new, unique and exceedingly useful video encoder which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed:

1. Apparatus for encoding video data representing an image, comprising:

a video encoder for receiving said video data, said video encoder compressing said video data using a compression algorithm having a bi-orthogonal (7,9) wavelet transform to generate compressed video data;

a random access memory connected to said video encoder, said random access memory operating as a temporary storage device for storing said compressed video data whenever said video encoder is compressing said video data;

a digital signal processor connected to said video encoder, said digital signal processor monitoring a data flow rate of said compressed video data from said video encoder, said digital signal processor adjusting compression ratios for said video encoder to maintain a constant data flow rate of said compressed video data from said video encoder; and a programmed gate array connected to said video encoder to receive said compressed video data, said programmed gate array converting said compressed video data from a parallel format to a serial format for transmission to an external processor, said programmed gate array maintaining a constant serial data flow rate of said compressed video data to said external processor.

2. The apparatus of claim 1 wherein said programmed gate array includes a parallel to serial shift register connected to said video encoder, said parallel to serial shift register converting said compressed video data from said parallel format to said serial format for transmission to said external processor.

3. The apparatus of claim 2 wherein said parallel to serial shift register comprises first and second four bit parallel to serial shift registers, said first four bit parallel to serial shift register having a data output connected to a data input of said second four bit parallel to serial shift register.

4. The apparatus of claim 2 wherein said programmed gate array includes a read write controller connected to said video encoder and said parallel to serial shift register, said read write controller providing a read signal to said video encoder to read said compressed video data from said video encoder and transfer said compressed video data to said programmed gate array, said read write controller providing write control signals to said parallel to serial shift register, said eight bit parallel to serial shift register, responsive to said write control signals, converting said compressed video data from said parallel format to said serial format.

5. The apparatus of claim 1 further comprising a microcontroller connected to said video encoder, said microcontroller initializing said video encoder and providing initial compression ratios to said video encoder when power is initially supplied to said video encoder.

6. The apparatus of claim 1 further comprising an EPROM connected to said digital signal processor, said EPROM containing software for said digital signal processor, said software enabling operation of said digital signal processor.

7. The apparatus of claim 6 further comprising an EPROM connector coupled to said EPROM, said EPROM connector being adapted to allow for a reprogramming of said EPROM by an external programming source connected to said EPROM connector.

8. Apparatus for encoding video data representing an image, comprising:

a video encoder for receiving said video data, said video encoder compressing said video data using a compression algorithm having a bi-orthogonal (7,9) wavelet transform to generate compressed video data;

a random access memory connected to said video encoder, said random access memory operating as a temporary storage device for storing said compressed video data whenever said video encoder is compressing said video data;

a digital signal processor connected to said video encoder, said digital signal processor monitoring a data flow rate of said compressed video data from said video encoder, said digital signal processor adjusting compression ratios for said video encoder to maintain a constant data flow rate of said compressed video data from said video encoder;

a programmed read only memory connected to said digital signal processor, said programmed read only memory containing software for said digital signal processor, said software enabling operation of said digital signal processor; and a programmed gate array connected to said video encoder to receive said compressed video data, said programmed gate array converting said compressed video data from a parallel format to a serial format for transmission to an external processor, said programmed gate array maintaining a constant serial data flow rate of said compressed video data to said external processor said video encoder having a data storage means connected to said programmed gate array, said data storage means storing said compressed video data prior to said video encoder providing said compressed video data to said programmed gate array;

said programmed gate array including a flush data controller connected to said data storage means;

said video encoder providing a service request signal to said programmed gate array whenever an overflow condition of said compressed video data is about to occur within said data storage means; and said flush data controller, responsive to said service request signal, flushing excess compressed video data from said data storage means whenever said overflow condition occurs within said data storage means.

9. The apparatus of claim 8 wherein said programmed gate array includes a parallel to serial shift register connected to said video encoder, said parallel to serial shift register converting said compressed video data from said parallel format to said serial format for transmission to said external processor.

10. The apparatus of claim 9 wherein said parallel to serial shift register comprises first and second four bit parallel to serial shift registers, said first four bit parallel to serial shift register having a data output connected to a data input of said second four bit parallel to serial shift register.

11. The apparatus of claim 9 wherein said programmed gate array includes a read write controller connected to said video encoder and said parallel to serial shift register, said read write controller providing a read signal to said video encoder to read said compressed video data from said video encoder and transfer said compressed video data to said programmed gate array, said read write controller providing write control signals to said parallel to serial shift register, said parallel to serial shift register, responsive to said write control signals, converting said compressed video data from said parallel format to said serial format.

12. The apparatus of claim 8 further comprising a microcontroller connected to said video encoder, said microcontroller initializing said video encoder and providing initial compression ratios to said video encoder when power is initially supplied to said video encoder.

13. The apparatus of claim 8 wherein said programmed read only memory comprises an EPROM.

14. The apparatus of claim 13 further comprising an EPROM connector coupled to said EPROM, said EPROM connector being adapted to allow for a reprogramming of said EPROM by an external programming source connected to said EPROM connector.

15. Apparatus for encoding video data representing an image, comprising:

a video encoder for receiving said video data, said video encoder compressing said video data using a compression algorithm having a bi-orthogonal (7,9) wavelet transform to generate compressed video data;

a random access memory connected to said video encoder, said random access memory operating as a temporary storage device for storing said compressed video data whenever said video encoder is compressing said video data;

a digital signal processor connected to said video encoder, said digital signal processor monitoring a data flow rate of said compressed video data from said video encoder, said digital signal processor adjusting compression ratios for said video encoder to maintain a constant data flow rate of said compressed video data from said video encoder;

a programmed read only memory connected to said digital signal processor, said programmed read only memory containing software for said digital signal processor, said software enabling operation of said digital signal processor; and a programmed gate array connected to said video encoder to receive said compressed video data, said programmed gate array converting said compressed video data from a parallel format to a serial format for transmission to an external processor, said programmed gate array maintaining a constant serial data flow rate of said compressed video data to said external processor said video encoder having a FIFO connected to said programmed gate array, said FIFO storing said compressed video data prior to said video encoder providing said compressed video data to said programmed gate array;

said programmed gate array including a flush data controller connected to said FIFO;

said video encoder providing a service request signal to said programmed gate array whenever an overflow condition of said compressed video data is about to occur within said FIFO;

said flush data controller, responsive to said service request signal, flushing excess compressed video data from said FIFO whenever said overflow condition occurs within said FIFO;

said video encoder providing a FIFO stop signal to the gate array whenever said FIFO is empty;

said programmed gate array, responsive to said FIFO stop signal setting a FIFO_MASK flag to a predetermined logic state t0 prevent a read operation of said FIFO within said video encoder, said programmed gate array generating dummy video data blocks and then transmitting said dummy video data blocks to said external processor whenever said overflow condition occurs within said FIFO.

16. The apparatus of claim 15 wherein said programmed gate array includes a parallel to serial shift register connected to said video encoder, said parallel to serial shift register converting said compressed video data from said parallel format to said serial format for transmission to said external processor.

17. The apparatus of claim 16 wherein said programmed gate array includes a read write controller connected to said video encoder and said parallel to serial shift register, said read write controller providing a read signal to said video encoder to read said compressed video data from said video encoder and transfer said compressed video data to said programmed gate array, said read write controller providing write control signals to said parallel to serial shift register, said eight bit parallel to serial shift register, responsive to said write control signals, converting said compressed video data from said parallel format to said serial format.

18. The apparatus of claim 15 further comprising a microcontroller connected to said video encoder, said microcontroller initializing said video encoder and providing initial compression ratios to said video encoder when power is initially supplied to said video encoder.

19. The apparatus of claim 15 wherein said programmed read only memory comprises an EPROM.

20. The apparatus of claim 19 further comprising an EPROM connector coupled to said EPROM, said EPROM connector being adapted to allow for a reprogramming of said EPROM by an external programming source connected to said EPROM connector.

* * * * *